United States Patent [19]

Tomforde

[11] 4,082,350
[45] Apr. 4, 1978

[54] SHELL-SHAPED CHILDREN'S SEAT FOR VEHICLES

[75] Inventor: Johann Tomforde, Magstadt, Germany

[73] Assignee: Daimler-Benz Aktiengesellschaft, Germany

[21] Appl. No.: 772,680

[22] Filed: Feb. 28, 1977

Related U.S. Application Data

[62] Division of Ser. No. 291,184, Sep. 22, 1972, Pat. No. 4,039,225.

[30] Foreign Application Priority Data

Sep. 22, 1971 Germany .............................. 2147248

[51] Int. Cl.² ............................................. A47C 15/00
[52] U.S. Cl. .................................... 297/243; 297/250; 297/251; 297/390
[58] Field of Search ............... 297/216, 243, 232, 250, 297/251, 253, 15, 130, 152, 384, 390, 411, 429; 296/63; 280/751; 248/188.1

[56] References Cited

U.S. PATENT DOCUMENTS

| | | | |
|---|---|---|---|
| 1,623,259 | 4/1927 | McGregor et al. | 297/390 X |
| 3,340,547 | 9/1967 | Welti | 297/232 X |
| 3,515,431 | 6/1970 | Grady | 297/243 X |
| 3,563,600 | 2/1971 | Converse | 297/390 X |
| 3,580,630 | 5/1971 | Fetler | 297/232 X |
| 3,659,865 | 5/1972 | Nothacker | 297/390 X |
| 3,722,951 | 3/1973 | Ezquerra | 297/390 |

*Primary Examiner*—Roy D. Frazier
*Assistant Examiner*—William E. Lyddane
*Attorney, Agent, or Firm*—Craig & Antonelli

[57] ABSTRACT

A shell-shaped children's seat for motor vehicles which is equipped with a headrest terminating in a backrest and with an impact member extending over the width of the shell and resting on the associated shell edge portions within the area of the seating surface; the impact member thereby extends rearwardly up to the transitional area of the backrest and the headrest, is pivotally connected thereat and can be tilted up visor-like after the disengagement of a locking device to facilitate ingress and egress of the seat.

19 Claims, 3 Drawing Figures

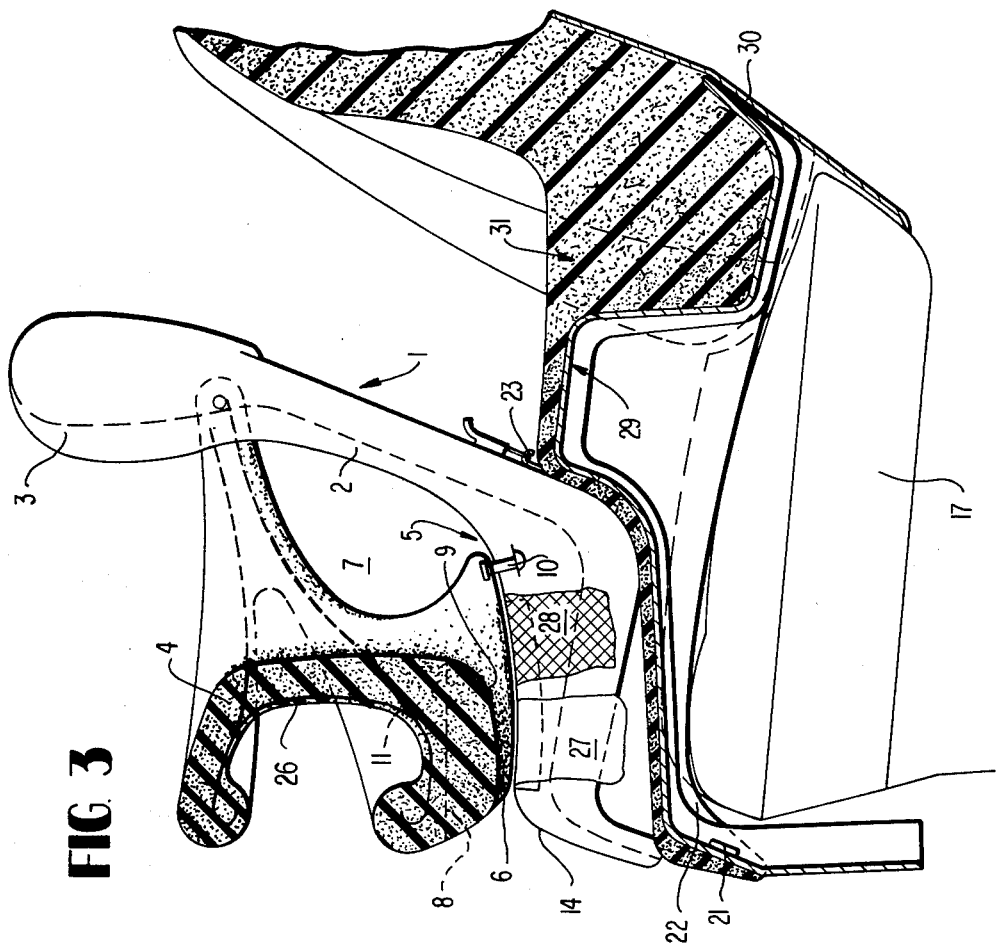
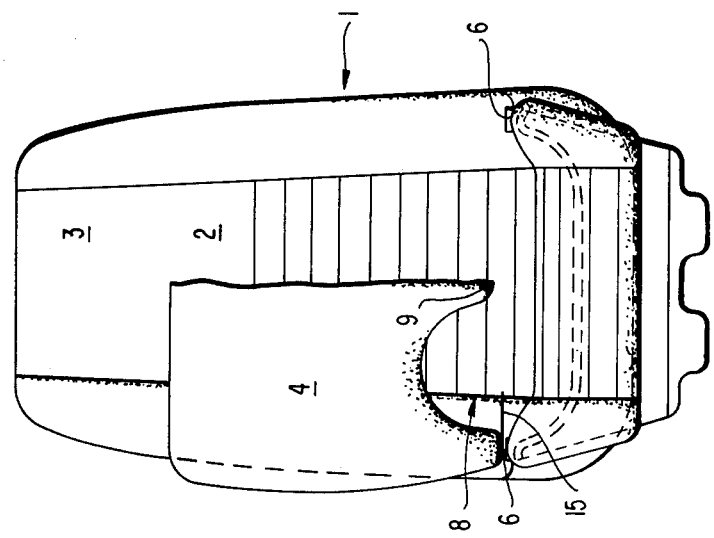

SHELL-SHAPED CHILDREN'S SEAT FOR VEHICLES

This is a division of application Ser. No. 291,184 filed Sep. 22, 1972 now U.S. Pat. No. 4,039,225.

The present invention relates to shell-shaped children's seats for vehicles, especially for motor vehicles, which is equipped with a backrest terminating in a headrest and with an impact cushion resting within the area of the seat surface on the associated shell walls and extending over the shell width.

A children's car seat is already disclosed in the German Offenlegungsschrift No. 1,930,891 which is fastened by means of belts at the seat part and at the backrest. An impact cushion extending over the shell width should normally serve as support for the head of the child in case of a strong deceleration of the vehicle. However, this prior art seat does not fulfill this requirement because the impact cushion covers only the upper body area. Additionally, the interspace up to the inner surface of the cusion is dimensioned too large in this prior art children's car seat so that in conjunction with the missing foot rest, the danger exists in case of a strong braking operation that the child slides down in the direction of the leg space.

It is the aim of the present invention to provide a shell-shaped children's seat which does not entail the aforementioned disadvantages and which offers the best possible protection for the child in all occurring driving situations.

Accordingly, a shell-shaped children's seat for vehicles, especially for motor vehicles, is proposed which is equipped with a backrest terminating in a headrest and with an impact cushion extending over the width of the shell and resting on the associated shell edge portions within the area of the seat surface, in which according to the present invention, the impact cushion extends up to the transitional area of the backrest and the headrest, is pivotally connected thereat and can be tilted up visor-like after disengagement of a locking means for the convenient boarding and leaving of the children's seat.

A seat support which satisfies the special requirements of children and which proves fatique-free even over long distances, is achieved if the impact cushion is provided with lateral indentations for extending therethrough the arms and with recesses at the bottom side for extending therethrough the legs.

Especially injuries of the neck spinal column are avoided in case of a rear impact if the headrest accommodates a force-dissipating deformation member which has an approximately loop-shaped cross section and which is supported at the back wall forming the shell body.

In one advantageous embodiment of the present invention, the impact cushion has an approximately oval cross section and is traversed by a tubularly shaped force-dissipating deformation member extending up to its pivotal connecting places in the transitional area of the backrest and the headrest.

In another advantageous embodiment of the present invention, the impact cushion has an approximately U-shaped cross section and is traversed at the inner side remote from the user by a force-dissipating deformation member which is approximately U-shaped and also extends up to its pivotal connecting places in the transitional area of the backrest and the headrest.

An additional safeguard against sliding off is obtained if a safety belt adjustable in its length and pivotally connected at the bottom side of the impact cushion can be installed thereat between the abutment surfaces of the impact cushion and the shell edge portions with abutment against the upper thighs, especially of small children.

It may also be of use if a fabric or net can be stretched from one shell edge portion to the other under abutment against the upper thighs, especially of small children.

A favorable location and placement of the children's seat is obtained if a bracket fixed in the vehicle and arranged between the front and back seat approximately in the vehicle center is equipped with a foot rest provided with a padded bead, which receives in a transverse slot the preferably cranked front edge of the children's seat, whereby a detachable connection between the bracket and the rear wall takes place by at least one rapid connecting and locking means of any conventional construction.

According to a further feature of the present invention, the foot rest is detachably connected in this embodiment with the bracket by at least one bolt and abuts against an inclined surface whereby after the disengagement of the bolt or bolts, the children's seat can be brought into a rearwardly tilted position adapted to be secured by renewed insertion of the bolt or bolts into now aligned bores in the foot rest and bracket.

Another possibility for the mounting and accommodation of the children's seat is created if a padded bearer which divides the rear seats in the vehicle longitudinal direction approximately centrally thereof and is connected with the partition wall of passenger space and luggage space, is provided with a forward step-shaped configuration for the suspension of the children's seat and with a rearward construction thereof as arm rest.

Accordingly, it is an object of the present invention to provide a shell-shaped motor vehicle seat for children which avoids by simple means the aforementioned shortcomings and drawbacks encountered in the prior art.

Another object of the present invention resides in a shell-shaped children's seat for vehicles, especially motor vehicles, which fully satisfies all requirements as regards correct support and protection of the seated child during all driving conditions.

A further object of the present invention resides in a seat for children in motor vehicles which not only effectively protects the child against impact in case of collision, but additionally assures that the child cannot slide off the seat into the leg space in case of a front end collision.

Still another object of the present invention resides in a motor vehicle seat for children which assures a correct seat position of the child that proves relatively fatigue-free even when driving over long distances.

A still further object of the present invention resides in a motor vehicle seat of the type described above which additionally protects the child against injuries of the neck spinal column in case of rear-end collisions, yet permits easy access to and from the seat.

Another object of the present invention resides in a motor vehicle seat for children which can be readily installed into the vehicle whenever used.

These and other objects, features and advantages of the present invention will become more apparent from the following description when taken in connection with the accompanying drawing which shows, for purposes of illustration only, two embodiments in accordance with the present invention, and wherein:

FIG. 2 is a front elevational view of the seat according to FIG. 1, without foot rest and with one-half of the impact cushion broken away; and FIG. 3 is a somewhat schematic view of a children's seat in accordance with the present invention located in direct proximity of the rear seat.

Figure 1:
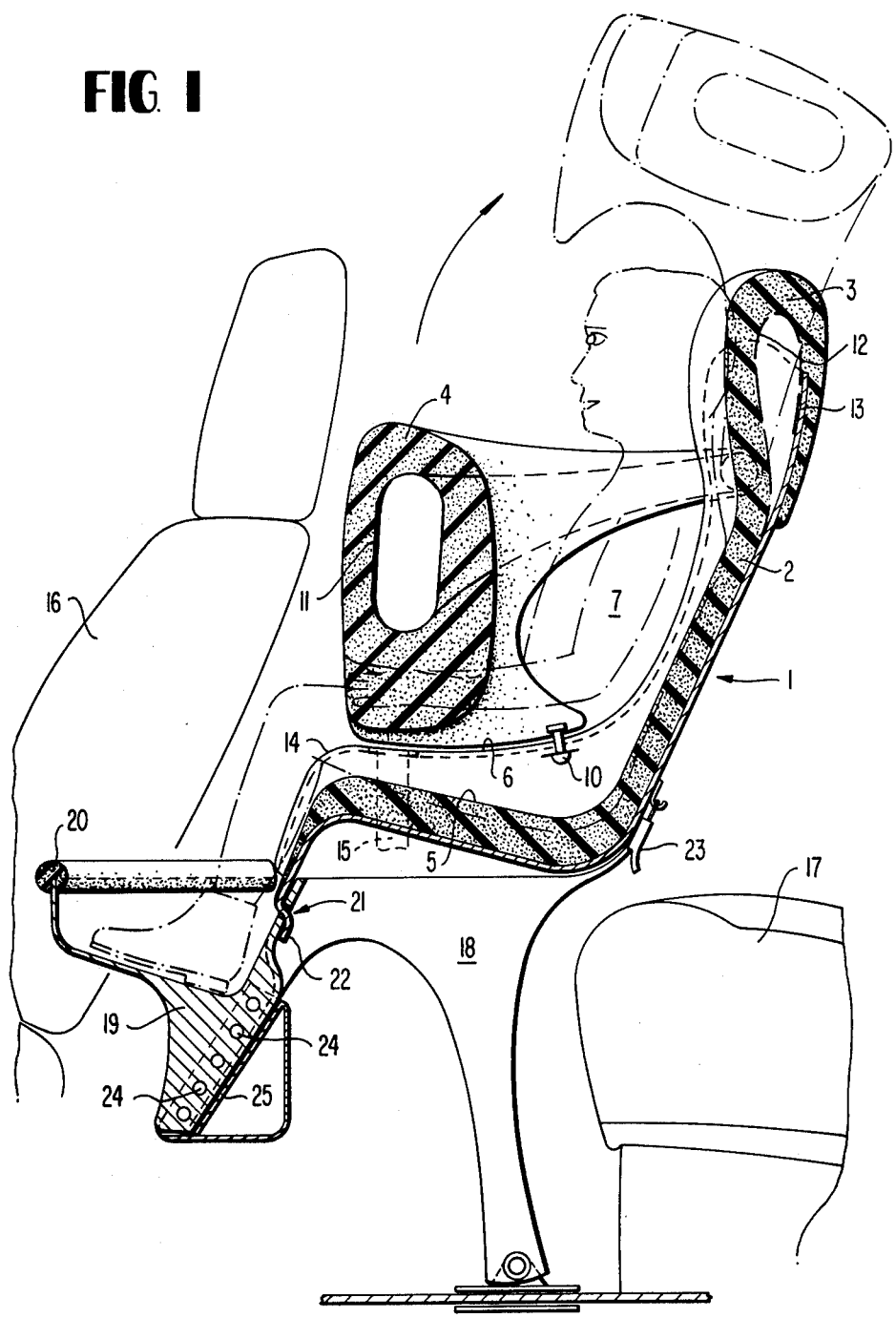
FIG. 1 is a somewhat schematic cross-sectional view through a children's seat arranged between the front and rear seats of a motor vehicle.

Referring now to the drawing wherein like reference numerals are used throughout the various views to designate like parts, and more particularly to FIGS. 1 and 2, with the shell-shaped children's seat generally designated therein by reference numeral 1, the backrest 2 terminates in a headrest 3. A padded impact member 4 such as an impact cushion which rests on the shell edge portions 6 within the area of the seating surface 5, extends in the upward direction up to its pivotal connecting places located within the transitional area of the backrest 2 and of the headrest 3. The impact cushion 4 which is provided with lateral indentations or openings 7 for extending therethrough the arms and with apertures or recesses 8 (FIG. 2) at the bottom side 9 for extending therethrough the legs, is connected with the children's seat 1 by at least one connecting and locking means 10 of any conventional construction and can be tilted up visor-like into the position indicated in dash and dot lines after the disengagement of the locking means 10 for purposes of facilitating, for example, the boarding operation. However, it would also be feasible within the scope of the present invention to pivot the impact cushion 4 into another plane by the use of another pivotal connection of the impact cushion 4. In the embodiment illustrated in FIGS. 1 and 2, the impact cushion 4 has an approximately oval cross section and is traversed by a tubularly shaped force-dissipating deformation member 11 extending up to its pivotal connecting places. Furthermore, a deformation member 12 is also embedded in the headrest 3, which also has an approximately loop-shaped cross section and is supported at the back wall 13 that forms the supporting or carrying part of the shell body. The child seated on the seat in accordance with the present invention receives a particularly good and effective protection by the construction of the children's seat 1 and of the impact cushion 4 according to the present invention while maintaining the greatest possible freedom of movement.

In order that in particular also small children can find a good support, a safety belt 15 adjustable in its length is secured at the bottom side 9 (FIG. 2) of the impact cushion 4 or at the shell walls 6 in proximity to the forward, rounded-off portions 14 (FIG. 1), which in the fastened condition rests on the upper thighs of the child and extends transversely over the seating surface 5.

A bracket 18 which is fixedly mounted on the vehicle is arranged approximately in the vehicle center for the purpose of mounting the children's seat 1 between the front seats 16 and the rear seats 17. A foot rest 19 with a padded bead 20 is provided with a transverse slot 21 into which is inserted the cranked or offset forward edge 22 of the seat 1. At least one further connection takes place between the bracket 18 and the back wall 13 by means of a rapid connecting and locking device 23 of any conventional construction. The fastening of the footrest 19 at the bracket 18 is achieved by two bolts 24 whereby simultaneously a support takes place at an inclined surface 25 of the bracket 18. After pulling out the bolts 24, the foot rest 19 can be slid upwardly and can be secured by renewed insertion of the bolts 24 into bores now coordinated thereto. A simultaneous back-tilting of the children's seat into a rearward rest position is connected with the pulling up of the foot rest 19.

The embodiment according to FIG. 3 corresponds far-reachingly to the embodiment described by reference to FIGS. 1 and 2. The children's seat generally designated by reference numeral 1 together with its backrest 2 and its headrest 3 includes again an impact cushion 4 which rests on the shell edge portions 6 within the area of the seating surface 5. In addition to lateral identations or openings 7 for extending therethrough the arms and apertures or recesses 8 at the bottom side 9 for extending therethrough the legs, the impact cushion 4 which has an approximately U-shaped cross section is also provided with a force-dissipating deformation member 11. The latter is embedded at the inner side 26 of the impact cushion 4, remote from the user, is constructed approximately U-shaped and extends up to its pivotal connecting places in the transitional area of backrest 2 and headrest 3. After the disengagement of a conventional locking and connecting means 10, the impact cushion can again be tilted up in a visor-like manner.

In order that in particular small children can find a sufficient support, the safety belt 15 according to FIGS. 1 and 2 can be replaced also by a fabric 27 and/or by a net 28 which is stretched over the upper thighs from one shell-edge portion 6 to the other and is arranged either at the bottom side 9 of the impact cushion 4 or at the shell edge portions 6 in proximity to the forward, rounded-off portions 14 thereof.

A padded bearer generally designated by reference numeral 29 is provided for the mounting of the seat 1, which subdivides the back seat 17 approximately centrally in the vehicle longitudinal direction and which is connected with the partition wall 30 between passenger space and luggage space. A step-shaped construction of the forward portion of the bearer 29 permits an insertion of the cranked or offset forward edge 22 of the child seat 1 within a transverse slot 21. A portion of the bearer 29 which is constructed as arm rest 31 extends rearwardly adjoining the backrest 2 which itself is connected with the bearer 29 by at least one rapid connecting and locking means 23 of any conventional construction.

Since the connecting and locking means 10 and 23 are of known construction, forming no part of the present invention, a detailed description thereof is dispensed with herein.

While I have shown and described two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompased by the scope of the appended claims.

What I claim is:

1. A shell-shaped children's seat for a vehicle, especially for a motor vehicle, which is equipped with a shell body with a seating surface means, with a backrest means terminating in a headrest means and with an impact cushion means extending substantially over a width of the shell body and resting on associated shell edge portions of the shell body within an area of the seating surface means, characterized in that the impact cushion means extends up to and is pivotally connected at a transitional area between the backrest means and headrest means, said impact cushion means being adapted to be tilted up visor-like after a disengagement of a locking means between the impact cushion means and the seating surface means for convenient boarding and leaving of the seat, the impact cushion means is provided with lateral indentations for extending therethrough the child's arms and with recesses at the bottom side thereof for extending therethrough the child's legs, the headrest means includes a force dissipating deformation member which has an approximately loop-shaped cross-section and is supported at a back wall means forming a part of the shell body, and in that a relatively fixed bracket means equipped with a footrest means having a padded bead means is provided between front and rear seats of the motor vehicle, a transverse slot means receiving a front edge of the children's seat is provided at the footrest means, and in that a detachable connection between the fixed bracket means and the back wall means of the shell body takes place by at least one rapid connecting means.

2. A children's seat according to claim 1, characterized in that the front edge of the seat inserted into the transverse slot means is cranked.

3. A children's seat according to claim 2, characterized in that the fixed bracket means is arranged approximately in the vehicle center.

4. A children's seat according to claim 3, characterized in that the foot rest means is detachably connected with the fixed bracket means by at least one bolt means and is supported against an inclined surface, and in that after disengagement of the bolt means the children's seat can be displaced into a rearward rest position adapted to be secured by a renewed insertion of the bolt means into aligned bores.

5. A shell-shaped children's seat for a vehicle, especially for a motor vehicle, which is equipped with a shell body with a seating surface means, with a backrest means terminating in a headrest means and with an impact cushion means extending substantially over a width of the shell body and resting on associated shell edge portions of the shell body within an area of the seating surface means, characterized in that the impact cushion means extends up to and is pivotally connected at a transitional area between the backrest means and the headrest means, said impact cushion means being adapted to be tilted up visor-like after a disengagement of a locking means between the impact cushion means and the seating surface means for convenient boarding and leaving of the seat, the impact cushion means is provided with lateral indentations for extending therethrough the child's arms and with recesses at a bottom side thereof for extending therethrough the child's legs, the headrest means includes a forcedissipating deformation member which has an approximately loop-shaped cross-section and is supported at a back wall means forming part of the shell body, and in that a padded bearer means is provided on a seat of the vehicle, said padded bearer means has a forward step-shaped construction for a suspension of the seat and a rearward construction as an arm rest, and means connecting said seat to said padded bearer means.

6. A children's seat according to claim 5, characterized in that the bearer means subdivides a rear seat in the vehicle longitudinal direction approximately centrally and is connected with a partition wall between passenger and luggage space.

7. A children's seat according to claim 4, characterized in that the impact cushion means has an approximately oval cross section and is traversed by an approximately tubularly shaped force-dissipating deformation member extending up to the pivotal connection of the impact cushion means within the transitional area of the backrest means and the headrest means.

8. A children's seat according to claim 4, characterized in that the impact cushion means has an approximately U-shaped cross section and is traversed at an inner side remote from a user by a force-dissipating deformation member also approximately of U-shape and extending up to the pivotal connection of the impact cushion means within the transitional area of the backrest and the headrest means.

9. A children's seat according to claim 4, characterized in that a safety belt adjustable in its length is provided for abutment at upper thighs, especially of small children, between abutment surfaces of the impact cushion means and the shell edge portions.

10. A children's seat according to claim 4, characterized in that a member secured at the bottom side of the impact cushion means can be stretched from one edge portion to the other under abutment at the upper thighs, especially of small children.

11. A children's seat according to claim 6, characterized in that the impact cushion means has an approximately oval cross section and is traversed by an approximately tubularly shaped force-dissipating deformation member extending up to the pivotal connection of the impact cushion means within the transitional area of the backrest means and the headrest means.

12. A children's seat according to claim 11, characterized in that the impact cushion means has an approximately U-shaped cross section and is traversed at the inner side remote from a user by a force dissipating deformation member also approximately of U-shape and extending up to the pivotal connection of the impact cushion means within the transitional area of the backrest and the headrest means.

13. A children's seat according to claim 6, characterized in that a safety belt adjustable in its length is provided for abutment at upper thighs, especially of small children, between abutment surfaces of the impact cushion means and the shell edge portions.

14. A shell-shaped children's seat for a vehicle, especially a motor vehicle, which is equipped with a shell body with a seating surface means, with a backrest means terminating in a headrest means and with an impact cushion means extending substantially over a width of the shell body and resting on associated shell edge portions of the shell body within an area of the seating surface means, characterized in that the impact cushion means extends up to and is pivotally connected at a transitional area between the backrest means and headrest means, said impact cushion means being adapted to be tilted up visor-like after a disengagement of a locking means between the impact cushion means and the seating surface means for convenient boarding and leaving of the seat, and in that a relatively fixed bracket means equipped with a footrest means having padded bead means is provided between front and rear seats of the motor vehicle, a transverse slot means receiving a front edge of the children's seat is provided at the footrest means, and in that a detachable connection between the fixed bracket means and a rear wall of the shell body takes place by at least one rapid connecting means.

15. A children's seat according to claim 14, characterized in that the front edge of the seat inserted into the transverse slot means is cranked.

16. A children's seat according to claim 15, characterized in that the fixed bracket means is arranged approximately in the vehicle center.

17. A children's seat according to claim 14, characterized in that the foot rest means is detachably connected with the fixed bracket means by at least one bolt means and is supported against an inclined surface, and in that after disengagement of the bolt means the children's seat can be displaced into a rearward rest position adapted to be secured by a renewed insertion of the bolt means into aligned bores.

18. A shell-shaped children's seat for a vehicle, especially a motor vehicle, which is equipped with a shell body with a seating surface means, with a backrest means terminating in a headrest means and with an impact cushion means extending substantially over a width of the shell body and resting on associated shell edge portions of the shell body within an area of the seating surface means, characterized in that the impact cushion means extends up to and is pivotally connected at a transitional area between the backrest means and headrest means, said impact cushion means being adapted to be tilted up visor-like after a disengagement of a locking means between the impact cushion means and the seating surface means for convenient boarding and leaving of the seat, and in that a padded bearer means is provided on a seat of the vehicle, said padded bearer means has a forward step-shaped construction for a suspension of the seat and a rearward construction as an arm rest, and means connecting said seat to said padded bearer means.

19. A children's seat according to claim 18, characterized in that the bearer means subdivides a rear seat in the vehicle longitudinal direction approximately centrally and is connected with a partition wall between passenger and luggage space.

* * * * *